(No Model.)

J. A. PEEL.
VEHICLE SHAFT SUPPORT.

No. 398,076. Patented Feb. 19, 1889.

WITNESSES:
A. D. Garfield
C. Sedgwick

INVENTOR:
J. A. Peel
BY Munn & Co.
ATTORNEYS.

UNITED STATES PATENT OFFICE.

JAMES ANDREW PEEL, OF SPRINGPORT, KENTUCKY.

VEHICLE-SHAFT SUPPORT.

SPECIFICATION forming part of Letters Patent No. 398,076, dated February 19, 1889.

Application filed November 19, 1888. Serial No. 291,246. (No model.)

*To all whom it may concern:*

Be it known that I, JAMES ANDREW PEEL, of Springport, in the county of Henry and State of Kentucky, have invented a new and Improved Shaft or Pole Support, of which the following is a full, clear, and exact description.

The object of this invention is to provide an attachment whereby the shafts or the pole of a vehicle may be supported in an elevated position at times when the vehicle is not in use; and to this end the invention consists, essentially, of an arm arranged for pivotal connection with the forward axle of the vehicle and a slotted plate with which such arm engages, the plate being arranged for connection with the pole or shafts, all as will be hereinafter more fully described, and specifically pointed out in the claims.

Reference is to be had to the accompanying drawings, forming a part of this specification, in which similar figures of reference indicate corresponding parts in both views.

Figure 1:
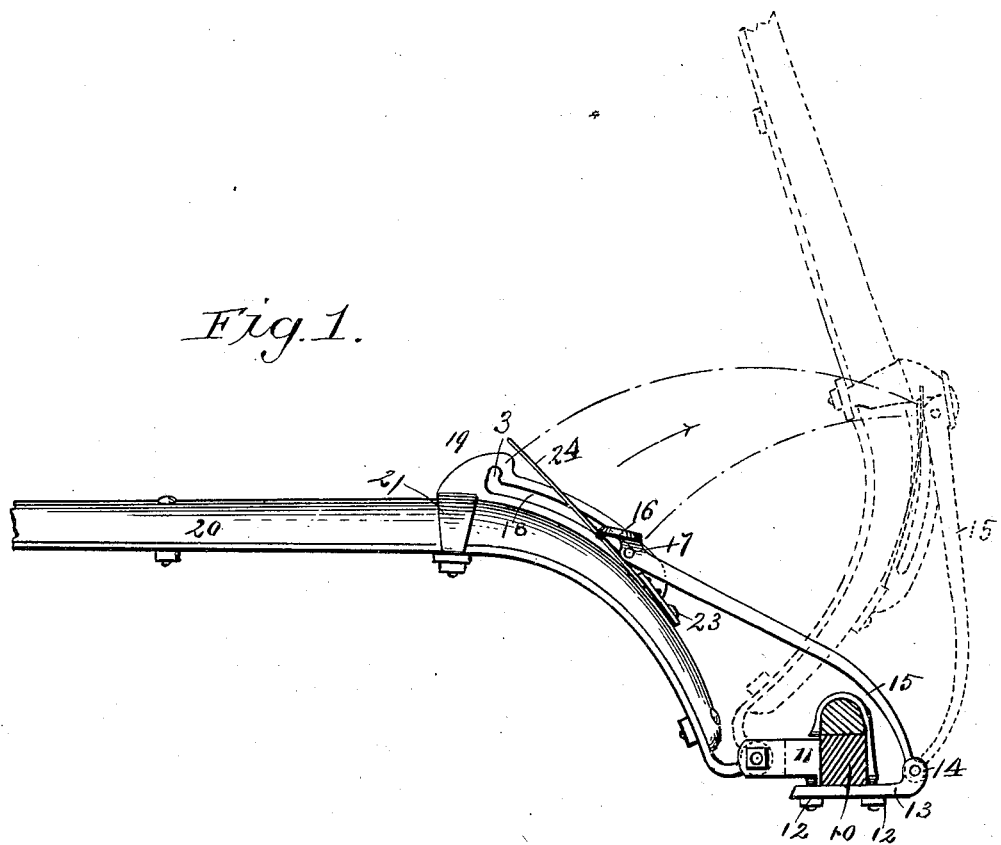
Figure 2:
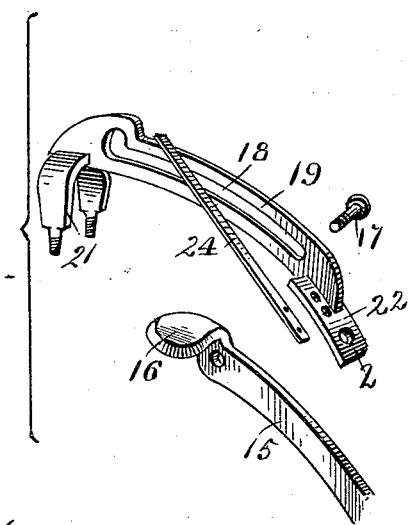

Figure 1 is a side view of my improved shaft or pole support, the shafts being shown in dotted lines as they appear when supported in a raised position; and Fig. 2 is a perspective view of a portion of the attachment, the parts being disconnected.

In the drawings, 10 represents the forward axle of a vehicle, and 11 the shaft-clip, that is held to place by nuts 12, that bear against the under side of a plate, 13, formed with an eye, 14, adapted to receive the inner end of an arm, 15. The outer end of this arm, 15, is provided with a thumb-piece, 16, and arranged to receive a stud, 17, that passes through a slot, 18, formed in a plate, 19, that is arranged for connection with the shafts 20, the forward end of the plate being provided with a clip, 21, while the rear end of the plate is provided with a flattened projection, 22, that is apertured at 2 to receive a screw, 23, as shown in Fig. 1.

Near the forward end of the plate 19 there is a practically vertical slot, 3, which runs at about right angles to the slot 18, the two forming an L-shaped slot, and to the plate 22 there is riveted a spring, 24, which bears against the under side of the forward end of the arm 15, acting to throw the stud 17 into the slot 3 when the shafts are moved to the position indicated by dotted lines in Fig. 1, and when the stud 17 so enters the slot 3 the shafts will be upheld, as indicated, and can only be lowered by throwing the arm 15 down against the tension of its spring 24, thus bringing the stud 17 into the slot 18.

It will of course be understood that although a specific construction has been described and illustrated, still such construction could be varied without departing from the spirit of my invention, and it will also be understood that the parts described may be used in other connections than those hereinbefore referred to.

Having thus described my invention, I claim as new and desire to secure by Letters Patent—

1. The combination, with an arm arranged for pivotal connection with a vehicle running-gear and provided with a stud, of a plate arranged for connection with the shafts of said vehicle and formed with an L-shaped slot, the shorter slot being at the forward end of the longitudinally-extending slot and at an angle thereto to form a shoulder to engage said stud, substantially as described.

2. The combination, with an arm arranged for pivotal connection with a vehicle running-gear and provided with a stud, of a plate formed with an L-shaped slot and arranged for connection with the vehicle-shafts, and a spring carried by the plate and arranged to bear upon the arm, the arm-stud riding in the plate-slot, as and for the purpose specified.

3. The combination, with an arm arranged for pivotal connection with a vehicle running-gear and provided with a thumb-piece and a stud, of a plate arranged for connection with the vehicle-shafts and formed with an L-shaped slot in which the arm-stud rides, and a spring carried by the plate and arranged to bear against the arm, as and for the purpose stated.

JAMES ANDREW PEEL.

Witnesses:
C. R. JOHNSON,
J. B. CARR.